(12) United States Patent
Shao et al.

(10) Patent No.: US 11,815,150 B1
(45) Date of Patent: Nov. 14, 2023

(54) MAGNETOSTRICTION-BASED VIBRATION SUPPRESSION APPARATUS FOR STEEL PIPE OF POWER TRANSMISSION TOWER AND SUPPRESSION METHOD THEREOF

(71) Applicant: POWERCHINA SEPCO1 ELECTRIC POWER CONSTRUCTION CO., LTD., Jinan (CN)

(72) Inventors: Guodong Shao, Jinan (CN); Yongyang Liu, Jinan (CN); Jianping Zhang, Jinan (CN); Ning Zhang, Jinan (CN); Li Tian, Jinan (CN); Junke Han, Jinan (CN)

(73) Assignee: POWERCHINA SEPCO1 ELECTRIC POWER CONSTRUCTION CO., LTD., Jinan (CN)

( * ) Notice: Subject to any disclaimer, the term of this patent is extended or adjusted under 35 U.S.C. 154(b) by 0 days.

(21) Appl. No.: 18/338,331

(22) Filed: Jun. 20, 2023

(30) Foreign Application Priority Data

Dec. 21, 2022 (CN) .......................... 202211644813.5

(51) Int. Cl.
*F16F 15/00* (2006.01)
*F16F 13/00* (2006.01)
*F16F 15/02* (2006.01)

(52) U.S. Cl.
CPC ............ *F16F 15/005* (2013.01); *F16F 13/00* (2013.01); *F16F 15/022* (2013.01);
(Continued)

(58) Field of Classification Search
CPC ........ F16F 15/005; F16F 15/022; F16F 13/00; F16F 2222/06; F16F 2224/0258; F16F 2224/0283; H02G 7/14
See application file for complete search history.

(56) References Cited

U.S. PATENT DOCUMENTS 1,766,995 A * 6/1930 Hofman ................... H02G 7/14
174/42
9,938,677 B2 4/2018 Wolters
(Continued)

FOREIGN PATENT DOCUMENTS

CN 106870288 A 6/2017
CN 110847674 A 2/2020
(Continued)

*Primary Examiner* — Xuan Lan Nguyen
(74) *Attorney, Agent, or Firm* — True Shepherd LLC; Andrew C. Cheng

(57) ABSTRACT

A magnetostriction-based vibration suppression apparatus for a steel pipe of a power transmission tower includes a lantern ring, four spoiler cups, and two control boxes; the lantern ring is fixedly sleeved on the steel pipe; mouths of the spoiler cups face outwards, and bottoms thereof are hinged on the lantern ring; the four spoiler cups are squarely distributed; and the two control boxes are symmetrically and fixedly mounted on the lantern ring; the control boxes are arranged as follows: the spoiler cups are arranged in pairs as a group, and each control box is arranged between two spoiler cups; each control box is provided therein with two groups of inerter units corresponding one-to-one to the spoiler cups. The vortex is avoided using a structure such as a spoiler cup, and the vibration kinetic energy of the steel pipe is consumed, thereby achieving an effective vibration reduction effect.

8 Claims, 6 Drawing Sheets

(52) U.S. Cl.
CPC ... *F16F 2222/06* (2013.01); *F16F 2224/0258* (2013.01); *F16F 2224/0283* (2013.01); *F16F 2228/066* (2013.01)

(56) References Cited

U.S. PATENT DOCUMENTS 10,024,378 B2    7/2018   Könitz et al.
10,184,245 B2    1/2019   Kim et al.

FOREIGN PATENT DOCUMENTS

| CN | 113889956 A | | 1/2022 | | |
|---|---|---|---|---|---|
| DE | 1046134 B | * | 12/1958 | ............... | H02G 7/14 |
| KR | 101029315 B1 | * | 4/2011 | ............... | H02G 7/14 |

* cited by examiner

MAGNETOSTRICTION-BASED VIBRATION SUPPRESSION APPARATUS FOR STEEL PIPE OF POWER TRANSMISSION TOWER AND SUPPRESSION METHOD THEREOF

CROSS-REFERENCE TO RELATED APPLICATIONS

This application claims priority to Chinese Patent Application No. 202211644813.5 with a filing date of Dec. 21, 2022. The content of the aforementioned application, including any intervening amendments thereto, is incorporated herein by reference.

FIELD OF THE INVENTION

The present disclosure relates to a technology for disaster prevention and mitigation of power transmission lines, and in particular to a magnetostriction-based vibration suppression apparatus for a steel pipe of a power transmission tower and suppression method thereof for suppressing breeze vibration of a power transmission tower member.

BACKGROUND OF THE INVENTION

The development of power transmission lines is moving towards large capacity and long distances. At present, the traditional angle steel towers have difficulty meeting the structural requirements of most power transmission towers with large spans and high hanging points. However, due to the section characteristics, the steel pipe towers have large section bending stiffness and small wind pressure shape coefficient, thus increasing the upper limit of the bearing capacity of power transmission towers, and improving the aerodynamic performance, which is more and more popular in new power transmission lines.

However, when a steady inflow wind of 0.5 to 10 m/s is applied to a steel pipe tower member with a large length-diameter ratio, breeze vibration will easily occur, and the constant shedding Karman vortex will be generated on the leeward side of the steel pipe, which will generate an alternating force with a certain frequency on the steel pipe. Due to exposure to the external environment, the natural wind will keep the steel pipe tower member in a resonance state for a long time. Such long-term vibration will lead to the tower connecting bolt loosening, connection plate damage, and bolt fatigue damage, which seriously affect the safety and stability of the power transmission tower.

At present, there are three common methods for controlling the breeze vibration of the steel pipe tower member:
1. Stiffness increase: the slenderness ratio of the member is designed or the supports are added to increase the stiffness, increasing the initial wind speed and reducing the probability of the breeze vibration. However, the method increases the amount of material and the weight of the tower, and the vibration reduction effect is limited.
2. Change of section shape: spoiler lines and spoiler plates are set on the periphery of the steel pipe to change the section shape and aerodynamic characteristics of the structure to reduce the probability of breeze vibration; however, the steel pipe will still vibrate when the wind is large.
3. Damping increase: a vibration reduction apparatus is provided on the steel pipe, and a damping material is provided at the joint; however, the durability of the damping material is poor, and it needs to be replaced regularly, which takes time and is laborious.

SUMMARY OF THE INVENTION

In order to solve the above problem of poor vibration reduction effect, the present disclosure provides a magnetostriction-based vibration suppression apparatus for a steel pipe of a power transmission tower, which uses a structure such as a spoiler cup to avoid vortex generation and reduce the possibility of vibration generation, and which may consume the vibration kinetic energy of the steel pipe when the steel pipe vibrates, thereby achieving a very effective vibration reduction effect. The specific technical solutions are as follows.

A magnetostriction-based vibration suppression apparatus for a steel pipe of a power transmission tower, including a lantern ring, four spoiler cups, and two control boxes; the lantern ring is fixedly sleeved on the steel pipe; mouths of the spoiler cups face outwards, and bottoms thereof are hinged on the lantern ring; the four spoiler cups are squarely distributed with a center of a circle of the lantern ring as a center; and the two control boxes are symmetrically and fixedly mounted on the lantern ring; the control boxes are arranged as follows: the spoiler cups are arranged in pairs as a group, and each control box is arranged between two spoiler cups; each control box is provided therein with two groups of inerter units corresponding one-to-one to the spoiler cups on both sides thereof.

For the above magnetostriction-based vibration suppression apparatus for a steel pipe of a power transmission tower, each group of the inerter units includes a horizontally-arranged sliding rod, a horizontally-arranged ball screw, and a ball nut and a flywheel matched with the ball screw.

One end of the ball screw is rotatably mounted in the control box via a bearing I, and the other end is fixedly mounted with the flywheel; the sliding rod horizontally and slidably penetrates the control box; the sliding rod is parallel to the ball screw; one end of the sliding rod is connected to the ball nut, and the other end extends out of the control box before being hinged to the spoiler cups.

For the above magnetostriction-based vibration suppression apparatus for a steel pipe of a power transmission tower, each inerter unit is configured with a stiffness assembly, the stiffness assembly including a magnetically-controlled shape memory alloy spring, a coil, and a power supply control assembly for power supply; the magnetically-controlled shape memory alloy spring is parallel to the ball screw; one end of the magnetically-controlled shape memory alloy spring is fixedly connected in the control box, and the other end is fixedly connected to the ball nut; the coil is mounted in the control box and faces the magnetically-controlled shape memory alloy spring; the power supply control assembly is mounted in the control box for supplying electric power to the coil.

For the above magnetostriction-based vibration suppression apparatus for a steel pipe of a power transmission tower, the power supply control assembly includes a battery, an acceleration sensor, a controller, and a fuse, forming a closed circuit with the coil.

For the above magnetostriction-based vibration suppression apparatus for a steel pipe of a power transmission tower, the control box is further provided therein with an energy storage assembly, the energy storage assembly including a wind cup, a rotating shaft, a magnet, two sets of magnetostrictive members, and two sets of piezoelectric sheets.

The rotating shaft is vertically and rotatably mounted at an intermediate position of the control box via a bearing II; the wind cup is rotatably mounted on top of the rotating shaft; the magnet is located inside the control box and is mounted on the rotating shaft, the magnet being two symmetrical sectors; the magnetostrictive member and the piezoelectric sheet are symmetrically arranged at the front and back sides of the magnet; the piezoelectric sheet is closely fitted between the magnetostrictive member and a side wall of the control box. The piezoelectric sheet is connected in series with a rectifier to store electricity in the power supply control assembly.

For the above magnetostriction-based vibration suppression apparatus for a steel pipe of a power transmission tower, a damping chamber is provided in the cup body of the spoiler cup; the damping chamber is provided with a damping net and filled with a damping fluid.

For the above magnetostriction-based vibration suppression apparatus for a steel pipe of a power transmission tower, an inner wall of the lantern ring is coated with a viscoelastic layer.

For the above magnetostriction-based vibration suppression apparatus for a steel pipe of a power transmission tower, the lantern ring is a hoop structure with two connectable semi-circles.

The present disclosure further provides a suppressing vibration method using the above apparatus.

First, reducing the occurrence of vibration: the steel pipe is subjected to wind, and the spoiler cup is subsequently subjected to the wind to change the trajectory of the wind to avoid the formation of vortexes and reduce the possibility of the vibration of the steel pipe.

Second, reducing vibration: the steel pipe is subjected to wind but the spoiler cup cannot limit the vibration of the steel pipe; the steel pipe vibrates up and down, driving the spoiler cup to rotate; and the sliding rod and the ball nut translate, driving the ball screw and the flywheel to rotate.

For the above magnetostriction-based vibration suppression method for a steel pipe of a power transmission tower, during vibration reduction, a damping fluid in the spoiler cup flows with the spoiler cup, rubs in a damping chamber, and flows through a damping net for energy dissipation.

For the above magnetostriction-based vibration suppression method for a steel pipe of a power transmission tower, during vibration reduction, the magnetically-controlled shape memory alloy spring compresses or stretches with the movement of the ball nut to absorb energy while a controller controls currents of a coil according to values detected by an acceleration sensor, and stiffness of the magnetically-controlled shape memory alloy spring varies with a magnetic field intensity of the coil; when the vibration of the steel pipe is finished, the magnetically-controlled shape memory alloy spring returns to its original length, and the sliding rod and the spoiler cup return to an initial position.

The advantageous effects of the present disclosure are as follows:
(1) The present disclosure has two functions of suppressing vibration, spoiling, and energy dissipation, by using a hierarchical control method, reducing the occurrence of breeze vibration, and suppressing the amplitude of breeze vibration in an all-around manner; and the vibration reduction effect is remarkable.
(2) The present disclosure uses the energy supply control assembly to realize the adaptive tuning of the vibration frequency of the steel pipe and automatically adjusts the stiffness through the vibration state of the steel pipe, widening the vibration reduction frequency band of the apparatus, increasing the vibration energy dissipation effect of the apparatus, and realizing the efficient suppression of the vibration of the steel pipe.
(3) The present disclosure is self-powered without the need for external power, utilizing piezoelectric structures to capture and store wind forces, which improves the continuous operation of the apparatus.
(4) The present disclosure, with a simple structure and easy mounting, can effectively suppress the breeze vibration of the steel pipe in a wide frequency band, and maintain the safe and stable operation of the power transmission line, having good economic and social benefits.

Figure 1:
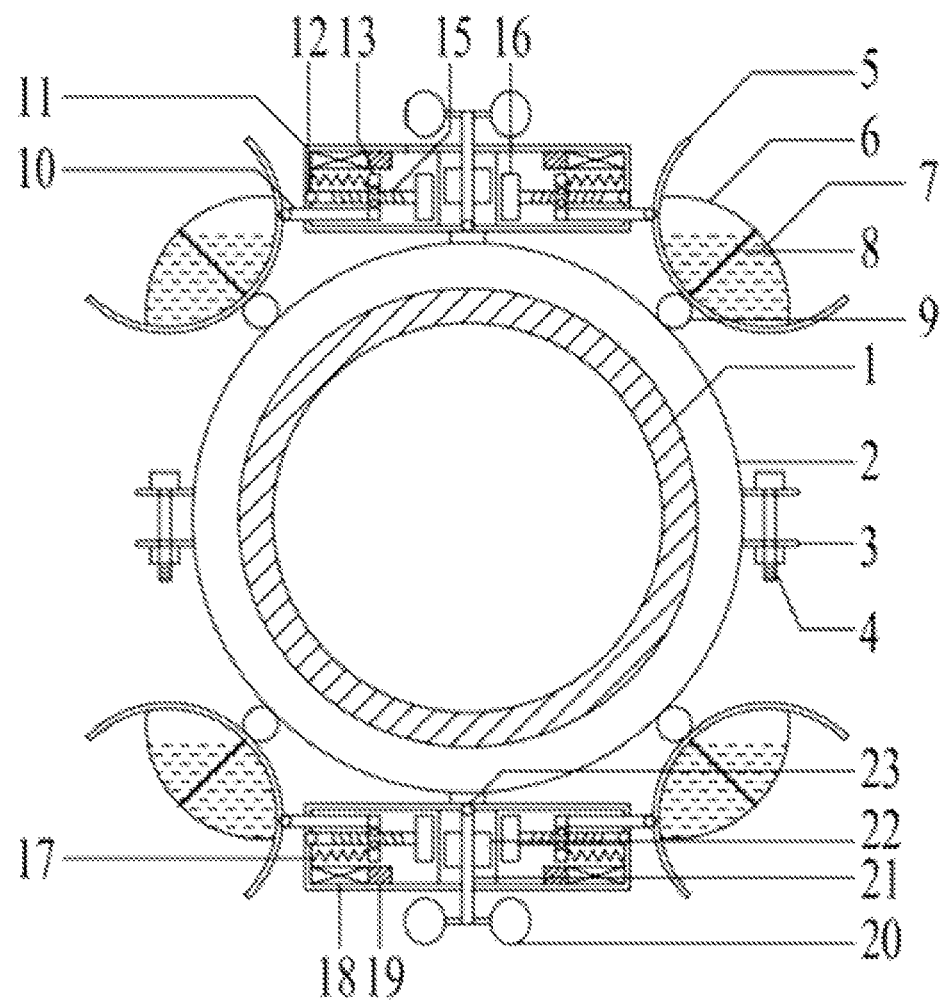
FIG. 1 is a structurally schematic diagram showing a front view of a magnetostriction-based vibration suppression apparatus according to an embodiment of the present disclosure.

In the drawings: 1, steel pipe; 2, lantern ring; 3, connection plate; 4, bolt; 5, spoiler cup; 6, damping chamber; 7, damping fluid; 8, damping net; 9, hinge; 10, sliding rod; 11, control box; 12, bearing I; 13, ball nut; 15, ball screw; 16, flywheel; 17, spring; 18, coil; 19, power supply control assembly; 20, wind cup; 21, rotating shaft; 22, magnet; 23, bearing II; 24, magnetostrictive member; 25, piezoelectric sheet; 26, battery; 27, rectifier; 28, acceleration sensor; 29, controller; and 30, fuse.

DETAILED DESCRIPTION OF THE EMBODIMENTS

The technical solutions of the present disclosure will be illustrated in detail with reference to the drawings.

It is to be noted that the terms used below are for the purpose of describing specific implementations only and are not intended to be limited to exemplary implementations according to the present application. The singular forms are intended to include the plural forms as well unless the context clearly indicates them. It is to be understood that in using the terms "contain" and/or "comprise/include" in the specification, it specifies the presence of features, steps, operations, devices, assemblies, and/or combinations thereof.

The terms "upper", "lower", "left", and "right" in the present embodiment refer to upper, lower, left, and right orientations in the plane shown in FIG. 1. The use of such orientations is not meant to be limiting in structure, merely to facilitate description of the present disclosure and to simplify the description, rather than indicating or implying that the device or element referred to must have a particular orientation.

As described in the background art, there is a deficiency in the vibration reduction effect of breeze vibration of the steel pipe tower member. The present embodiment provides a magnetostriction-based vibration suppression apparatus for a steel pipe of a power transmission tower and suppression method thereof.

The vibration suppression apparatus for a steel pipe of a power transmission tower according to the present embodiment includes a lantern ring 2, four spoiler cups 5, and two control boxes 11. The lantern ring 2 is fixedly sleeved on the steel pipe 1; mouths of the spoiler cups 5 face outwards, and bottoms thereof are hinged on the lantern ring 2 through a hinge 9; the four spoiler cups 5 are squarely distributed with a center of a circle of the lantern ring 2 as a center; and the two control boxes 11 are symmetrically and fixedly mounted on the lantern ring 2.

Figure 2:
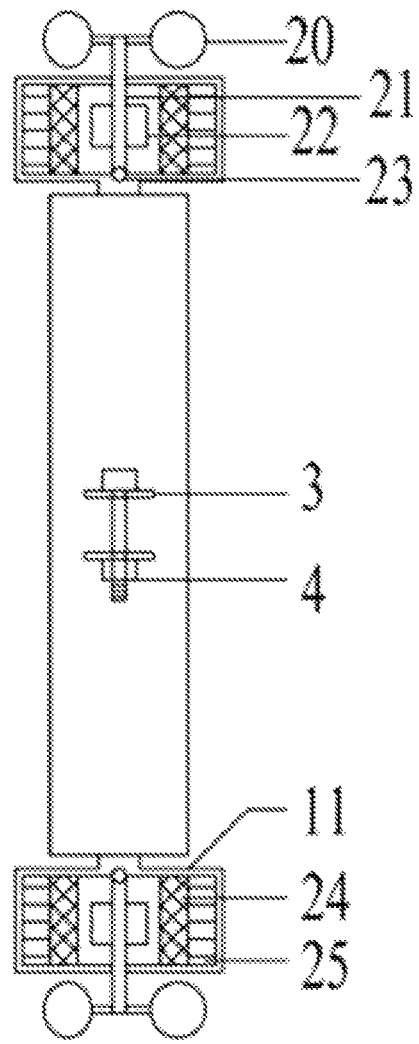
FIG. 2 is a structurally schematic diagram showing a side view of the magnetostriction-based vibration suppression apparatus according to an embodiment of the present disclosure.

As shown in FIGS. 1 and 2, the lantern ring 2 is a hoop structure with two connectable semi-circles; connection plates 3 are fixedly connected with a bolt 4, so that the whole apparatus is easy to be dismounted. The inner wall of the lantern ring 2 is coated with a viscoelastic layer for adhering the lantern ring 2 to the steel pipe 1; and the viscoelastic layer functions as a certain buffering and energy absorption, reducing the friction and collision between the steel pipe 1 and the lantern ring 2.

The viscoelastic layer uses an existing material specially used as a damping layer, and the main features of such a material are related to temperature and frequency; when the frequency is high or the temperature is low to a certain extent, it is in a glassy state and loses the damping property; at low frequency or high temperature, it is in a rubbery state, and the damping is small; only at a medium frequency and medium temperature, the damping is maximum and the elasticity is equal to a middle value. Viscoelastic materials commonly used may be divided into four categories according to the different base levels: asphalt, water-soluble substance, latex, and epoxy resin, in which fillers and solvents are properly added, which can greatly increase the damping.

A damping chamber 6 is provided in the cup body of the spoiler cup 5; a damping fluid 7 is filled in the damping chamber 6; and a damping net 8 may also be provided in the damping chamber 6 in order to improve the damping effect.

Figure 3:
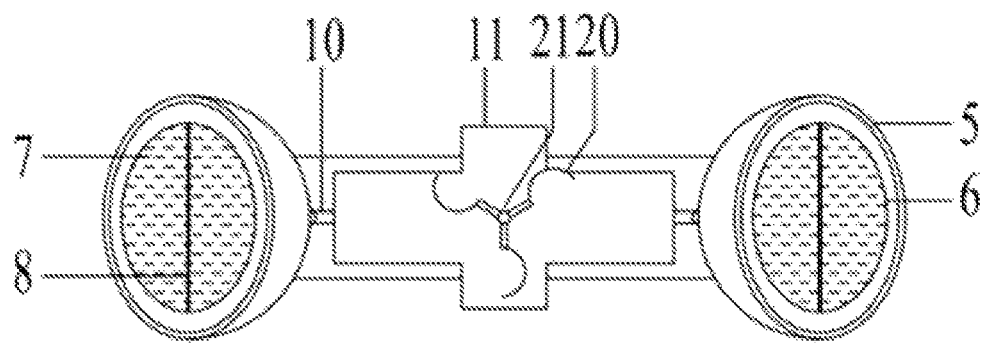
FIG. 3 is a structurally schematic diagram showing a top view of the magnetostriction-based vibration suppression apparatus according to an embodiment of the present disclosure.

The control boxes 11 are arranged as follows: the spoiler cups 5 are arranged in pairs as a group, and each control box 11 is arranged between two spoiler cups 5; each control box 11 is provided therein with two groups of inerter units corresponding one-to-one to the spoiler cups 5 on both sides thereof. As shown in FIGS. 1 and 3, the control box 11 in the present embodiment has a cross shape, with two sets of energy supply assemblies symmetrically mounted at the shorter end, and inerter units, stiffness assemblies, and the like mounted at the longer ends.

Figure 5:
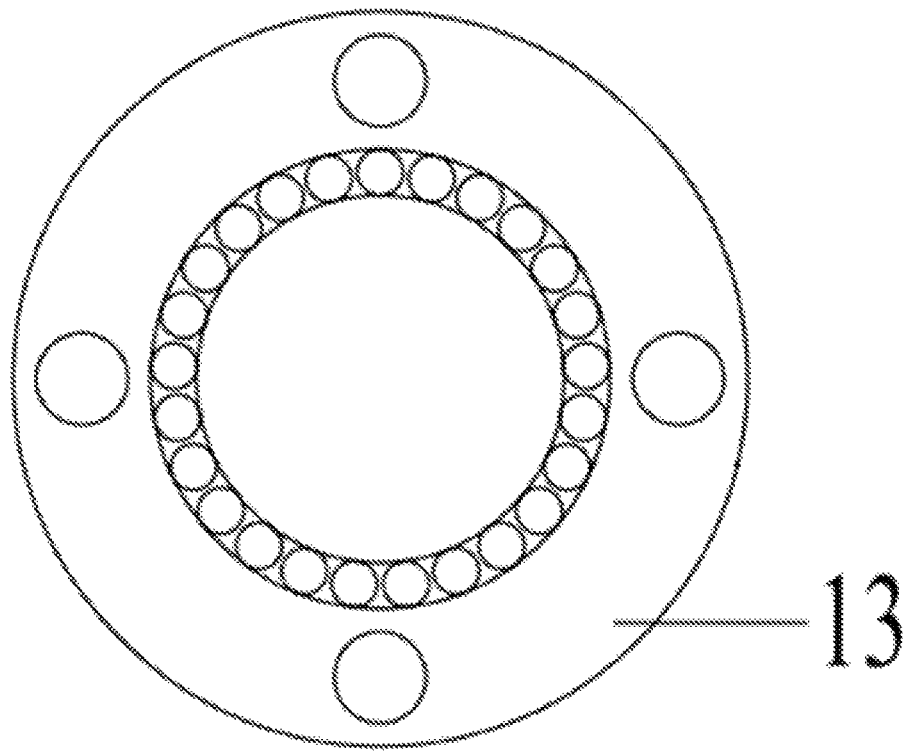
FIG. 5 is a schematic diagram showing a ball nut according to an embodiment of the present disclosure.

As shown in FIGS. 1 and 5, each group of the inerter units includes a horizontally-arranged sliding rod 10, a horizontally-arranged ball screw 15, and a ball nut 13 and a flywheel 16 matched with the ball screw 15; one end of the ball screw 15 is rotatably mounted in the control box 11 via a bearing I 12, and the other end is fixedly mounted with the flywheel 16. The flywheel 16 can not only reduce the natural frequency of the steel pipe 1, but also convert vibration energy into rotational energy for energy dissipation. The sliding rod 10 horizontally and slidably penetrates the control box 11; the sliding rod 10 is parallel to the ball screw 15; one end of the sliding rod 10 is connected to the ball nut 13, and the other end extends out of the control box 11 before being hinged to the spoiler cups 5. When the steel pipe 1 is subjected to wind vibration, the spoiler cup 5 with a cup body-shaped structure will also be subjected to wind and rotate around the hinge 9; the sliding rod 10 moves along with the horizontal straight line; and the ball nut 13 is connected to the sliding rod 10 and moves along with the straight line, thereby driving the ball screw 15 to rotate and the flywheel 16 to rotate, so that the kinetic energy of the rotation of the spoiler cup 5 can be consumed to achieve a vibration reduction effect.

Further, each inerter unit is configured with a stiffness assembly, the stiffness assembly including a magnetically-controlled shape memory alloy spring 17, a coil 18, and an integrated power supply control assembly 19; the magnetically-controlled shape memory alloy spring 17 is parallel to the ball screw 15; one end of the magnetically-controlled shape memory alloy spring 17 is fixedly connected in the control box 11, and the other end is fixedly connected to the ball nut 13; the coil 18 is mounted in the control box 11 and faces the magnetically-controlled shape memory alloy spring 17. The power supply control assembly 19 is mounted in the control box 11 for supplying electric power to the coil 18. The magnetically-controlled shape memory alloy spring 17 has a stiffness that varies with the magnetic field and is in a compressed state during periods of non-operation for fixing the position of the spoiler cup 5.

Figure 6:
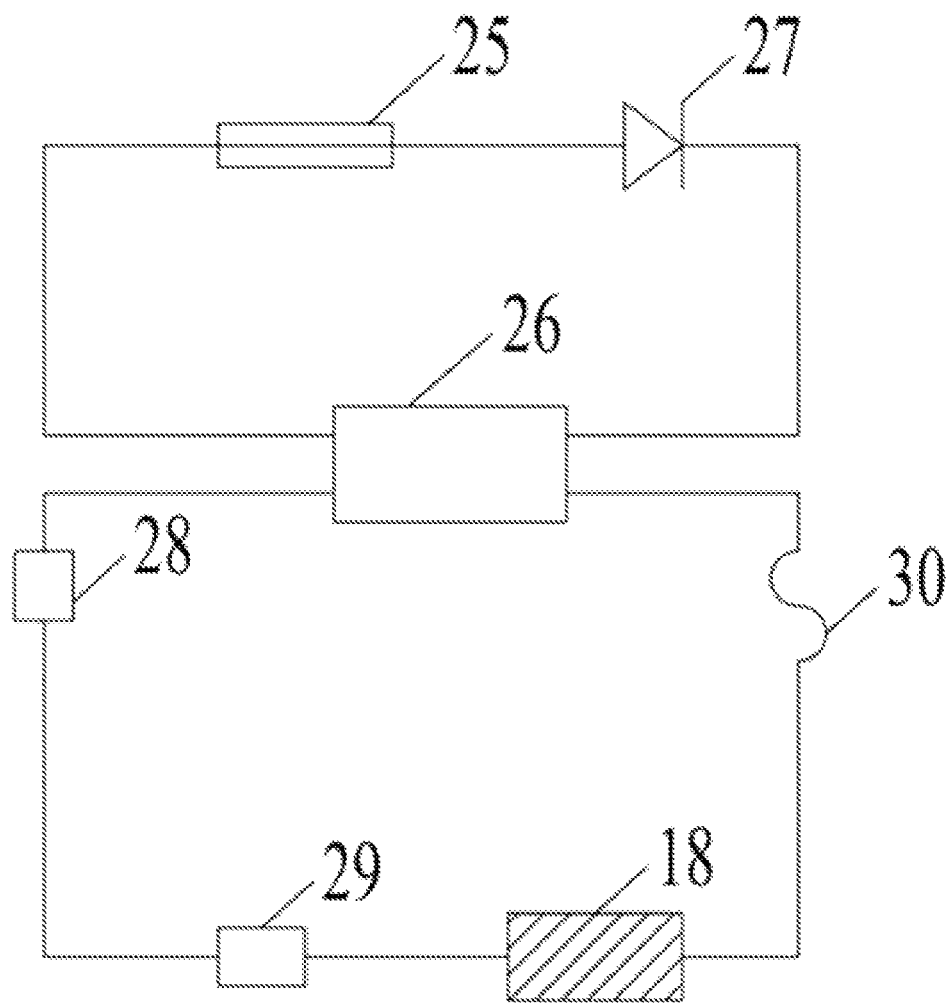
FIG. 6 is a schematic circuit diagram showing battery power supply and energy storage according to an embodiment of the present disclosure.

As shown in FIGS. 1 and 6, the power supply control assembly 19 includes a battery 26, an acceleration sensor 28, a controller 29, and a fuse 30, forming a closed circuit with the coil 18. The control principle of the power supply control assembly 19 is that the acceleration sensor 28 is used for measuring the vibration rate value of the steel pipe 1, and adjusting the stiffness of the magnetically-controlled shape memory alloy spring 17 according to the vibration rate value; the larger the acceleration rate value is, the larger the vibration frequency is; the controller 29 reduces the current of the coil 18 to reduce the magnetic field so as to increase the stiffness of the magnetically-controlled shape memory alloy spring 17, so that the resonance frequency of the vibration suppression apparatus approaches the excitation frequency, thereby achieving the maximum vibration absorption and energy dissipation effects.

Furthermore, the control box 11 is further provided therein with an energy storage assembly. As shown in FIG. 2, the energy storage assembly includes a wind cup 20, a rotating shaft 21, a magnet 22, two sets of magnetostrictive members 24, and two sets of piezoelectric sheets 25.

Figure 4:
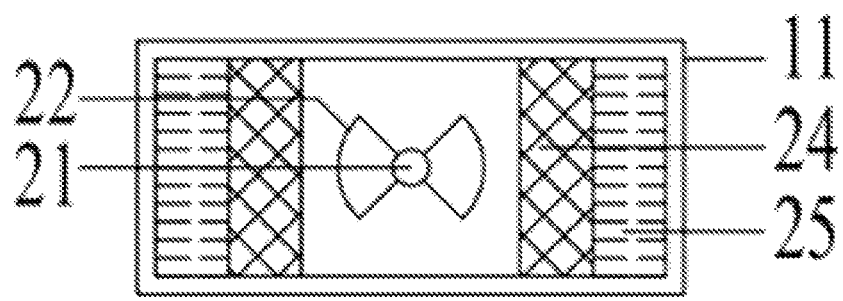
FIG. 4 is a top view schematic diagram showing an internal power generation assembly of a control box according to an embodiment of the present disclosure.

The rotating shaft 21 is vertically and rotatably mounted at an intermediate position of the control box 11 via a bearing II 23; the wind cup 20 is rotatably mounted on a top of the rotating shaft 21, the wind cup 20 being of a three-cup type; the magnet 22 is located inside the control box 11 and is mounted on the rotating shaft 21. As shown in FIG. 4, the magnet 22 is two symmetrical sectors; the magnetostrictive member 24 and the piezoelectric sheet 25 are symmetrically arranged at front and back sides of the magnet 22. The magnetostrictive member 24 is made of a magnetostrictive material that elongates or shortens in the direction of magnetization, and the dimension of the magnetostrictive member 24 changes significantly when the applied current changes or the distance from the magnet is changed. The piezoelectric sheet 25 is closely fitted between the magnetostrictive member 24 and a side wall of the control box 11.

As shown in FIG. 6, the piezoelectric sheet 25 is connected in series with the rectifier 27 to charge the battery 26. The magnet 22 rotates with the rotation of the rotating shaft 21, creating a changing magnetic field due to the sector shape; and the magnetostrictive member 24 telescopically changes to press the piezoelectric sheet 25 to generate an electric charge and generate the electric current through the rectifier 27 before storing in the storage battery 26 for power supply.

The control box 11 and the rotating shaft 21 are both made of a non-magnetic aluminum alloy to avoid degradation of the magnetic field performance.

The vibration suppression method for vibration of the power transmission tower steel pipe according to the present embodiment is as follows:

First, reducing the occurrence of vibration: the steel pipe 1 is subjected to wind, and the spoiler cup 5 is subsequently subjected to wind to change the trajectory of the wind to avoid the formation of vortexes and the vibration of the steel pipe 1.

Second, reducing vibration: the steel pipe 1 is subjected to wind but the spoiler cup 5 cannot limit the vibration of the steel pipe 1; the steel pipe 1 vibrates up and down, driving the spoiler cup 5 to rotate; and the sliding rod 10 and the ball nut 13 translate, driving the ball screw 15 and the flywheel 16 to rotate.

In the case of vibration reduction, the damping fluid 7 in the spoiler cup 5 flows with the spoiler cup 5, rubs against the inner wall of the damping chamber 6, and flows through the damping net 8 for energy dissipation, to offset the vibration kinetic energy of the steel pipe 1.

In the case of vibration reduction, the magnetically-controlled shape memory alloy spring 17 compresses or stretches with the movement of the ball nut 13 to absorb energy while a controller 29 controls currents of a coil 18 according to values detected by an acceleration sensor 28, and stiffness of the magnetically-controlled shape memory alloy spring 17 varies with the magnetic field intensity of the coil 18. In this way, an intelligent adjustment of the vibration reduction is achieved. When the vibration is finished, the magnetically-controlled shape memory alloy spring 17 returns to its original length, and the sliding rod 10 and the spoiler cup 5 return to an initial position, to ensure the normal operation for the next vibration reduction.

The wind cup 20 rotates under the action of wind force, and the rotating shaft 21 and the magnet 22 rotate therewith to change the magnetic field where the magnetostrictive member 24 is located; and the magnetostrictive member 24 deforms and presses the piezoelectric sheet 25 according to the change of the magnetic field, so that the piezoelectric sheet 25 generates electric charges and forms currents via a rectifier 27 to be stored in a storage battery 26, realizing self-power supply of the apparatus.

The apparatus has two suppressing modes of spoiling and energy dissipation, by using a hierarchical control method, reducing the occurrence of breeze vibration, and suppressing the amplitude of breeze vibration in an all-around manner. The semi-active control of vibration reduction is achieved by changing the stiffness through the current regulation of the magnetically-controlled shape memory alloy spring 17 and coil 18, which widens the vibration reduction frequency band. Inerter vibration reduction technology is used to improve the efficiency of vibration reduction and energy dissipation of the apparatus. The vibration reduction effect of the apparatus is obvious, and wind vibration of the steel pipe 1 can be effectively suppressed. The apparatus also utilizes the magnetostrictive member 24 and piezoelectric sheet 25 structure to capture and utilize the wind force, automatically storing energy and improving the continuous operation capability of the apparatus.

What is claimed is:

1. A magnetostriction-based vibration suppression apparatus for a steel pipe of a power transmission tower, comprising: a lantern ring (2), four spoiler cups (5), and two control boxes (11), wherein the lantern ring (2) is fixedly sleeved on the steel pipe (1); mouths of the spoiler cups (5) face outwards, and bottoms thereof are hinged on the lantern ring (2); the four spoiler cups (5) are squarely distributed with a center of the lantern ring (2) as a center; and the two control boxes (11) are symmetrically and fixedly mounted on the lantern ring (2);

wherein the control boxes (11) are arranged as follows: the spoiler cups (5) are arranged in pairs as a group, and each control box (11) is arranged between two spoiler cups (5); each control box (11) is provided therein with two groups of inerter units corresponding one-to-one to the spoiler cups (5) on both sides thereof;

wherein each group of the inerter units comprises a horizontally-arranged sliding rod (10), a horizontally-arranged ball screw (15), and a ball nut (13) and a flywheel (16) matched with the ball screw (15);

wherein one end of the ball screw (15) is rotatably mounted in the control box (11) via a bearing I (12), and the other end is fixedly mounted with the flywheel (16); the sliding rod (10) horizontally and slidably penetrates the control box (11); the sliding rod (10) is parallel to the ball screw (15); one end of the sliding rod (10) is connected to the ball nut (13), and the other end extends out of the control box (11) and hinged to the spoiler cups (5);

wherein each inerter unit is configured with a stiffness assembly, the stiffness assembly comprising a magnetically-controlled shape memory alloy spring (17), a coil (18), and a power supply control assembly (19) for power supply; the magnetically-controlled shape memory alloy spring (17) is parallel to the ball screw (15); one end of the magnetically-controlled shape memory alloy spring (17) is fixedly connected in the control box (11), and the other end is fixedly connected to the ball nut (13); the coil (18) is mounted in the control box (11) and faces the magnetically-controlled shape memory alloy spring (17); the power supply control assembly (19) is mounted in the control box (11) for supplying electric power to the coil (18); and wherein the power supply control assembly (19) comprises a battery (26), an acceleration sensor (28), a controller (29), and a fuse (30), forming a closed circuit with the coil (18).

2. The magnetostriction-based vibration suppression apparatus according to claim 1, wherein the control box (11) is further provided therein with an energy storage assembly, the energy storage assembly comprising a wind cup (20), a rotating shaft (21), a magnet (22), two sets of magnetostrictive members (24), and two sets of piezoelectric sheets (25); and wherein the rotating shaft (21) is vertically and rotatably mounted at an intermediate position of the control box (11) via a bearing II (23); the wind cup (20) is rotatably mounted on a top of the rotating shaft (21); the magnet (22) is located inside the control box (11) and is mounted on the rotating shaft (21), the magnet (22) being two symmetrical sectors; the magnetostrictive member (24) and the piezoelectric sheet (25) are symmetrically arranged at front and back sides of the magnet (22); the piezoelectric sheet (25) is closely fitted between the magnetostrictive member (24) and a side wall of the control box (11); the piezoelectric sheet

(25) is connected in series with a rectifier (27) to store electricity to the power supply control assembly (19).

3. The magnetostriction-based vibration suppression apparatus according to claim 1, wherein a damping chamber (6) is provided in a cup body of the spoiler cup (5); the damping chamber (6) is provided with a damping net (8) and filled with a damping fluid (7).

4. The magnetostriction-based vibration suppression apparatus according to claim 1, wherein an inner wall of the lantern ring (2) is coated with a viscoelastic layer.

5. The magnetostriction-based vibration suppression apparatus according to claim 1, wherein the lantern ring (2) is a hoop structure with two connectable semi-circles.

6. A magnetostriction-based vibration suppression method for a steel pipe of a power transmission tower, wherein the vibration suppression apparatus according to claim 1 is used,
   first, reducing an occurrence of vibration: the steel pipe (1) is subjected to wind, and the spoiler cup (5) is subsequently subjected to the wind to change a trajectory of the wind to avoid a formation of vortexes and reduce the vibration of the steel pipe (1); and
   second, reducing vibration: the steel pipe (1) is subjected to the wind but the spoiler cup (5) cannot limit the vibration of the steel pipe (1); the steel pipe (1) vibrates up and down, driving the spoiler cup (5) to rotate; and the sliding rod (10) and the ball nut (13) translate, driving the ball screw (15) and the flywheel (16) to rotate.

7. The magnetostriction-based vibration suppression method according to claim 6, wherein during vibration reduction, a damping fluid (7) in the spoiler cup (5) flows with the spoiler cup (5), rubs in a damping chamber (6), and flows through a damping net (8) for energy dissipation.

8. The magnetostriction-based vibration suppression method according to claim 6, wherein during vibration reduction, the magnetically-controlled shape memory alloy spring (17) compresses or stretches with movement of the ball nut (13) to absorb energy while a controller (29) controls currents of a coil (18) according to values detected by an acceleration sensor (28), and stiffness of the magnetically-controlled shape memory alloy spring (17) varies with a magnetic field intensity of the coil (18); when the vibration of the steel pipe (1) is finished, the magnetically-controlled shape memory alloy spring (17) returns to its original length, and the sliding rod (10) and the spoiler cup (5) return to an initial position.

\* \* \* \* \*